(12) United States Patent
Petersen et al.

(10) Patent No.: US 6,269,360 B1
(45) Date of Patent: Jul. 31, 2001

(54) OPTIMIZATION OF ORDERED STORES ON A PIPELINED BUS VIA SELF-INITIATED RETRY

(75) Inventors: Thomas Albert Petersen, Austin; James Nolan Hardage, Jr., Kyle, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/066,012

(22) Filed: Apr. 24, 1998

(51) Int. Cl.[7] .................................................. G06F 17/30
(52) U.S. Cl. .............................. 707/2; 710/116; 710/707; 710/112; 710/113
(58) Field of Search ............................. 707/2, 3, 4, 5, 707/6, 201, 202, 200; 709/208, 1; 710/104, 107, 108, 110, 112, 113, 116, 126, 129; 712/1, 29

(56) References Cited

U.S. PATENT DOCUMENTS

| 3,688,274 | | 8/1972 | Cormier et al. ......................... 710/5 |
|---|---|---|---|
| 4,044,337 | | 8/1977 | Hicks et al. ............................ 714/19 |
| 5,185,871 | | 2/1993 | Frey et al. ............................. 712/205 |
| 5,293,621 | | 3/1994 | White et al. ........................... 710/107 |
| 5,319,766 | * | 6/1994 | Thaller et al. ........................ 710/113 |
| 5,388,224 | * | 2/1995 | Maskas ................................. 710/104 |
| 5,535,345 | | 7/1996 | Fisch et al. ........................... 710/129 |
| 5,555,382 | * | 9/1996 | Thaller et al. ........................ 711/146 |
| 5,592,631 | * | 1/1997 | Kelly et al. ........................... 710/110 |
| 5,623,628 | | 4/1997 | Brayton et al. ....................... 711/141 |
| 5,629,950 | * | 5/1997 | Godiwala et al. .................... 714/805 |
| 5,796,977 | * | 8/1998 | Saranghar et al. ...................... 709/1 |
| 5,797,026 | * | 8/1998 | Rhodehamel et al. ................. 712/1 |
| 5,987,549 | * | 11/1999 | Hagersten et al. .................... 710/107 |

* cited by examiner

Primary Examiner—Thomas Black
Assistant Examiner—Diane D. Mizrahi
(74) Attorney, Agent, or Firm—Anthony V. S. England; Bracewell & Patterson, L.L.P.

(57) ABSTRACT

Where a plurality of ordered transactions are received for data transfers on a pipelined bus, each transaction in the series is initiated before all prospective retry responses to the preceding ordered transactions may be asserted. The address responses to all preceding ordered transfers are then monitored in connection with performance of the newly initiated transfer. If a retry response to any preceding ordered transaction is asserted, a self-initiated retry response for all subsequent transactions, including the newly initiated transfer, is also asserted. The system-retried transactions and all succeeding, ordered transactions are immediately reattempted. The overlapping performance of the ordered transfers reduces the latency of non-retried transfers, achieving performance comparable to non-ordered transactions. Even where a retry response is asserted, the total latency required for completion of both transactions in the ordered pair is reduced by at least a portion of the address-to-response latency, so that the impact of ordering requirements on system performance is minimized. Strict ordering is thus enforced while taking full advantage of the pipelined nature of the bus to maximize utilization of the bus bandwidth.

20 Claims, 4 Drawing Sheets

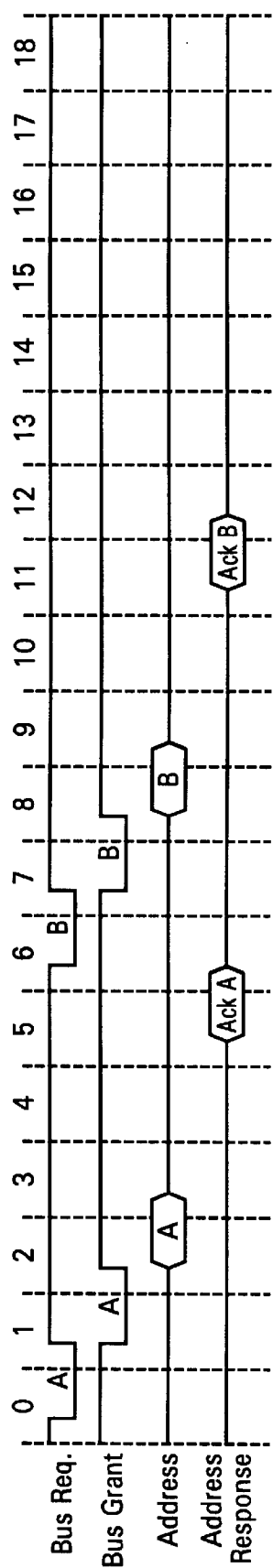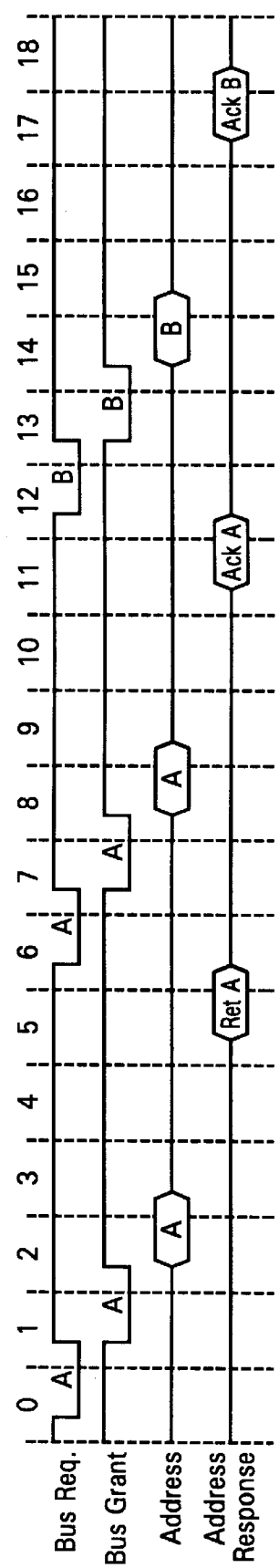
Fig. 4A
Fig. 4B

OPTIMIZATION OF ORDERED STORES ON A PIPELINED BUS VIA SELF-INITIATED RETRY

BACKGROUND OF THE INVENTION

1. Technical Field

The present invention relates in general to data transfers within data processing systems and in particular to ordered data stores on a pipelined bus within a data processing system. Still more particularly, the present invention relates to optimization of ordered stores on a pipelined bus within a data processing system to improve system performance.

2. Description of the Related Art

Integrated circuits which transfer data within data processing systems, particularly processors, are required to adhere to certain requirements for such data transfers. One possible requirement is ordering, where data transfer transactions must be completed on a system bus in the order that an execution unit generated the transactions. An ordering requirement between multiple data transfer transactions may occur, for example, in the context of multiple stores to the same address.

Other reasons exist for ordering requirements besides matching addresses for multiple stores. Typical processor architectures associate attributes with certain address ranges, such as the WIMG bits associated with page table entries within the PowerPC™ architecture. These attributes may specify the ordering of transactions to addresses within the associated address range. Moreover, depending on the type of memory model implemented, a processor architecture may support instructions which dictate specific transaction ordering, such as the EIEIO, SYNC, and TLBSYNC instructions within the PowerPC™ family of processors. These and other processor features may impose ordering requirements on data transfer transactions within a data processing systems.

Contemporary high performance processors typically utilize a high frequency, pipelined bus interface. The pipelined nature allows multiple transactions to be active on the bus simultaneously. In general, a bus transaction may be broken down into the following segments:

- arbitration for the bus;
- presentation of the address and transaction type on the bus (to be decoded for slave selection and snooped for memory coherency);
- response by slaves and snooping masters to the transaction address, which may be an acknowledge (Ack) that the transfer may proceed as requested or a retry (Retry) which aborts the transaction and causes it to be initiated again later starting with arbitration; and
- transfer of data, which may occur before or after the address response, or not at all for address-only transactions.

A data transfer transaction is complete after the later of the last datum being presented and accepted or receiving a satisfactory address response.

To enforce strict ordering between data transfers, current processors completely serialize the transactions. Any pending transfer subject to an ordering requirement with a previous transfer is delayed from the beginning (bus arbitration) if the previous transfer is not complete or at least guaranteed to complete in the present bus tenure (i.e., the transfer has past the point where the bus protocol permits retry of the transfer).

FIGS. 4A and 4B are bus timing diagrams showing the general serialization of two ordered transfers. FIG. 4A is a timing diagram for non-retried transfers, while FIG. 4B is a timing diagram for the same operation when the first transfer receives an address response indicating a retry. In both figures, the address response is valid three clock cycles after the address is valid on the bus. In both cases, the bus request for data transfer B is not initiated until an acknowledge response is received for data transfer A. This requires a latency of at least six clock cycles for the best case or twelve clock cycles if a retry is asserted before data transfer B may be initiated. As shown in the figures, the total latency—from start of the first transaction to completion of the second—is twelve clock cycles with no retry response and eighteen clock cycles if a retry response of the first transaction is asserted.

In the example depicted, an address response three clock cycles after the address is valid is the only mechanism for retrying a data transfer. Some bus protocols may support multiple windows for responses—one for slave responses and one for snoop responses—with a much higher latency between the address and the final response. The higher the latency, the longer the delay before starting a succeeding, ordered transfer and the lower the overall performance for serialized data transfers.

It would be desirable, therefore, to provide a mechanism for reducing the latency of ordered transactions on a pipelined bus within a data processing system. It would further be advantageous for the mechanism to take full advantage of the pipelined nature of the bus while preserving the ordering requirement.

SUMMARY OF THE INVENTION

It is therefore one object of the present invention to provide an improved method and apparatus for data transfers within data processing systems.

It is another object of the present invention to provide an improved method and apparatus for ordered data stores on a pipelined bus within a data processing system.

It is yet another object of the present invention to provide a method and apparatus for optimization of ordered stores on a pipelined bus within a data processing system to improve system performance.

The foregoing objects are achieved as is now described. Where a plurality of ordered transactions are received for data transfers on a pipelined bus, each transaction in the series is initiated before all prospective retry responses to the preceding ordered transactions may be asserted. The address responses to all preceding ordered transfers are then monitored in connection with performance of the newly initiated transfer. If a retry response to any preceding ordered transaction is asserted, a self-initiated retry response for all subsequent transactions, including the newly initiated transfer, is also asserted. The system-retried transactions and all succeeding, ordered transactions are immediately reattempted. The overlapping performance of the ordered transfers reduces the latency of non-retried transfers, achieving performance comparable to non-ordered transactions. Even where a retry response is asserted, the total latency required for completion of both transactions in the ordered pair is reduced by at least a portion of the address-to-response latency, so that the impact of ordering requirements on system performance is minimized. Strict ordering is thus enforced while taking full advantage of the pipelined nature of the bus to maximize utilization of the bus bandwidth.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A–4B are bus timing diagrams showing the general serialization of two ordering transfers in accordance with the known art.

DETAILED DESCRIPTION OF THE PREFERRED EMBODIMENT

Figure 1:
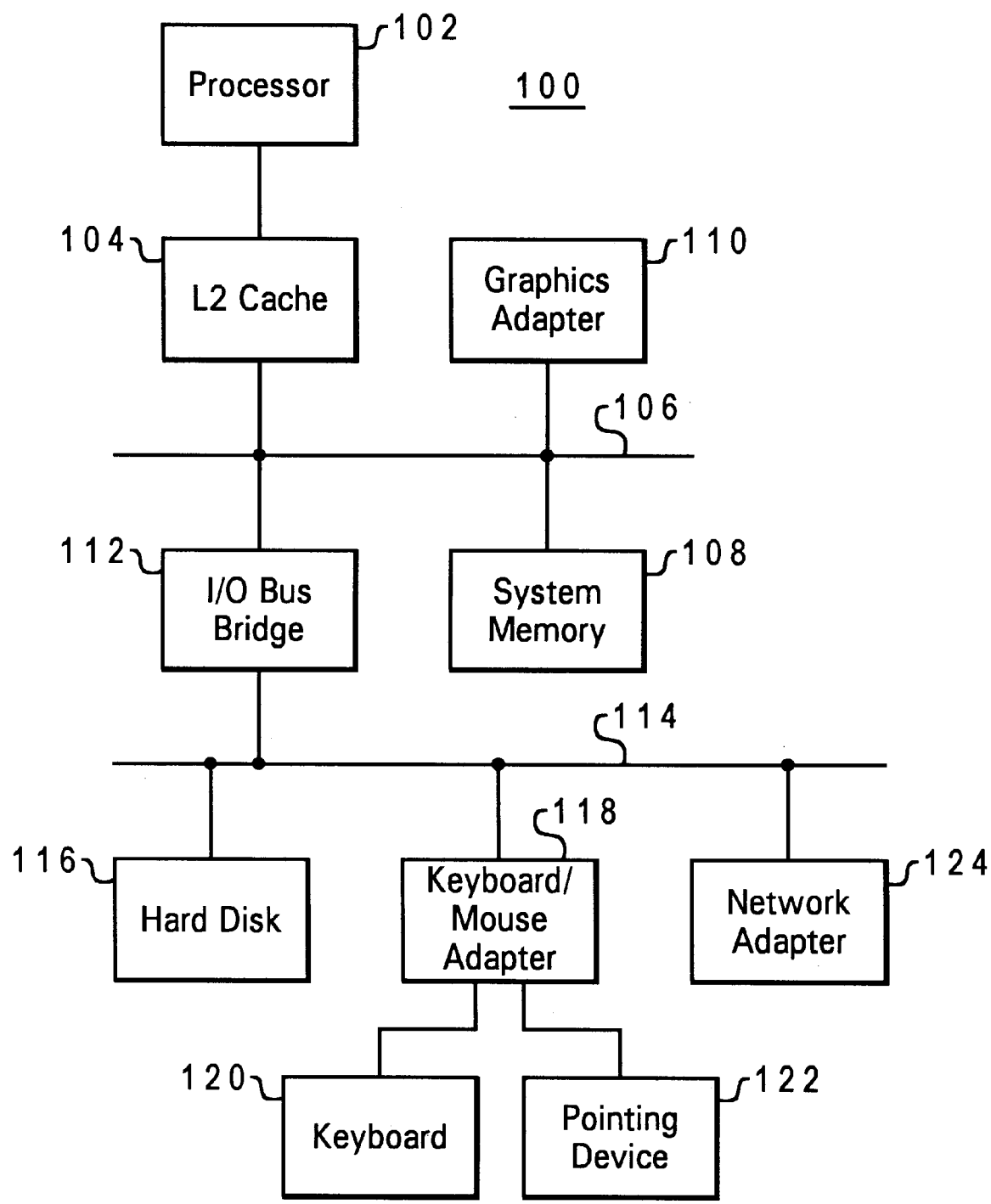
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 in the exemplary embodiment includes a processor 102, which may be a PowerPC™ processor available from International Business Machines Corporation of Armonk, N.Y. or Motorola Corporation of Schaumburg, Ill. Processor 102 is connected to a level two (L2) cache 104, which is utilized to stage data to and from processor 102 at reduced access latency. L2 cache 104 is connected in turn to an interconnect or system bus 106, which is also connected, in the embodiment depicted, to system memory 108 and memory-mapped graphics adapter 110, which provides a connection for a display device (not shown).

Also connected to system bus 106 in the exemplary embodiment is input/output (I/O) bus bridge 112, which provides an interface between system bus 106 and I/O bus 114. A nonvolatile memory such as hard disk drive 116 may be connected to I/O bus 114, as may keyboard/mouse adapter 118, which provides connection to I/O bus 114 for keyboard 120 and pointing device 122. Pointing device 122 may be a mouse, trackball, or the like. Also connected to I/O bus 114 may be network adapter 124 for connecting data processing system 100 to a local area network (LAN), the Internet, or both. Those skilled in the art will appreciate that other devices may be incorporated into data processing system 100, such as an optical disk drive or a modem.

The operation of data processing systems of the type depicted in FIG. 1 is well known in the art. Program information comprising instructions and/or data is stored in nonvolatile memory 116 and may be selectively copied into system memory 108 once data processing system 100 is powered on. Processor 102 executes the instructions within such program information and generates text or graphical information for presentation on display device connected via graphics adapter 110, where the information may be viewed by a user. The user may selectively control operation of data processing system 100 through input entered on keyboard 120 or through pointing device 122.

In accordance with the present invention, data processing system 100 supports ordering requirements for data transactions. However, ordered transactions are not completely serialized, but may be overlapped by initiating a data transfer while previous, ordered data transfers have not completed, monitoring the address responses to the previous data transfer transactions, and self-asserting a retry of the subsequent data transfer transaction if a retry response is detected for any previous data transfer transaction within the ordered series. The logic for implementing this mechanism for performing ordered transactions, described in further detail below, may be implemented within a bus interface unit of processor 102 and/or L2 cache 104.

Figure 2A:
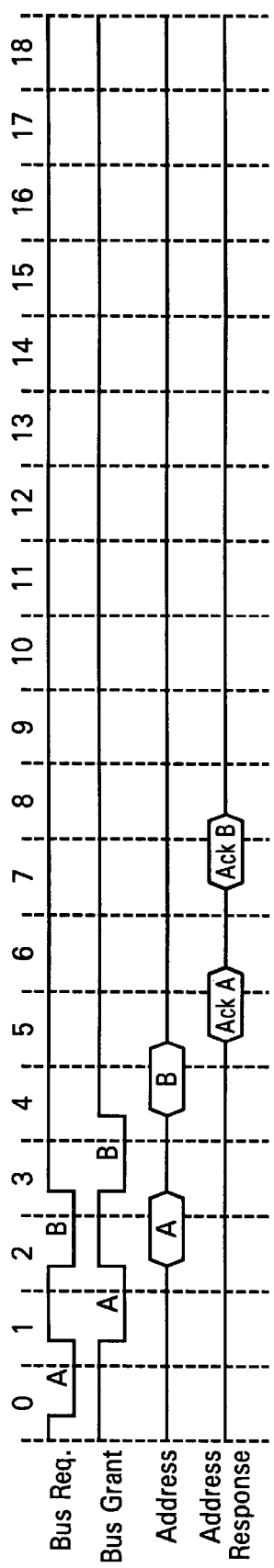
FIGS. 2A–2B are bus timing diagrams for performing ordered transactions on a pipelined bus in accordance with a preferred embodiment of the present invention.
Figure 2B:
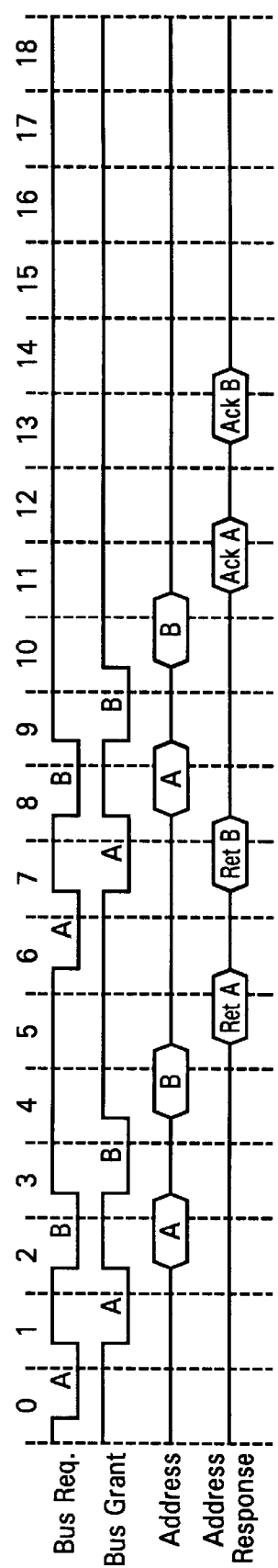

Referring to FIGS. 2A–2B, bus timing diagrams for performing ordered transactions on a pipelined bus in accordance with a preferred embodiment of the present invention are illustrated. FIG. 2A is a bus timing diagram for two ordered data transfers where no retry is detected. As with the known art, bus arbitration for a first data transaction (transaction A) begins the ordered transaction pair. In the present invention, however, bus arbitration for a second data transaction, transaction B, begins immediately after completion of the prior bus arbitration, overlapping the address presentation of transaction A. If transaction A is not retried, transaction A is completed in the clock cycle following address presentation for transaction B. Thus a latency of only two clock cycles is required to initiate transaction B after transaction A is initiated, and the total latency—from start of the first transaction to completion of the second—is only eight clock cycles with no retry response. It is noteworthy that this sequence may be identical for ordered or non-ordered transactions, and hence there is no impact on system performance for ordered transactions which are not retried.

FIG. 2B is a bus timing diagram for the same pair of ordered transactions where a retry response is asserted for the first transaction, transaction A. In order to conform to the ordering requirement, the device initiating a transaction in the present invention must be cognizant of the address response of all preceding transactions with which it must be ordered. That is, if a transaction on the bus received an address response which causes the transaction to be retried, a succeeding transaction which must be ordered with the retried transaction is, if active on the bus, also retried by self assertion of a retry address response. All transfers may then be reattempted immediately.

In the example shown, arbitration for transaction B commences one clock cycle after completion of arbitration for transaction A. The address for transaction A is presented during arbitration for the bus for transaction B, and the address response for transaction A is valid three clock cycles later, two clock cycles after completion of arbitration for the bus for transaction B and one clock cycle after presentation of the address for transaction B. If a retry response to transaction A is asserted (clock cycles 5–6), a self-initiated retry response to transaction B (clock cycles 7–8) is also asserted. Bus arbitration for transaction A is repeated immediately after the retry response for transaction A is detected, and bus arbitration for transaction B is again restarted one clock cycle after arbitration for transaction A is complete. The total latency from the initiation of transaction A to completion of transaction B is only fourteen clock cycles when the first transaction receives a retry response.

The self-initiated retry in response to a retry of a previous, ordered transaction prevents the possibility of a succeeding data transfer from completing on the bus before the previous, retried data transfer. Although only two ordered transactions were utilized for the purposes of explaining the invention, the mechanism of the present invention may be extended to as many transactions as the bus protocol may concurrently support. For each transaction subject to an ordering requirement with at least one previous transaction, however, the address response to all previous transactions for which an ordering requirement exists must be monitored. If any pending transaction is retried, each subsequent transaction in the ordering requirement must be self-retried and reattempted after reinitiating the retried transaction.

Figure 3:
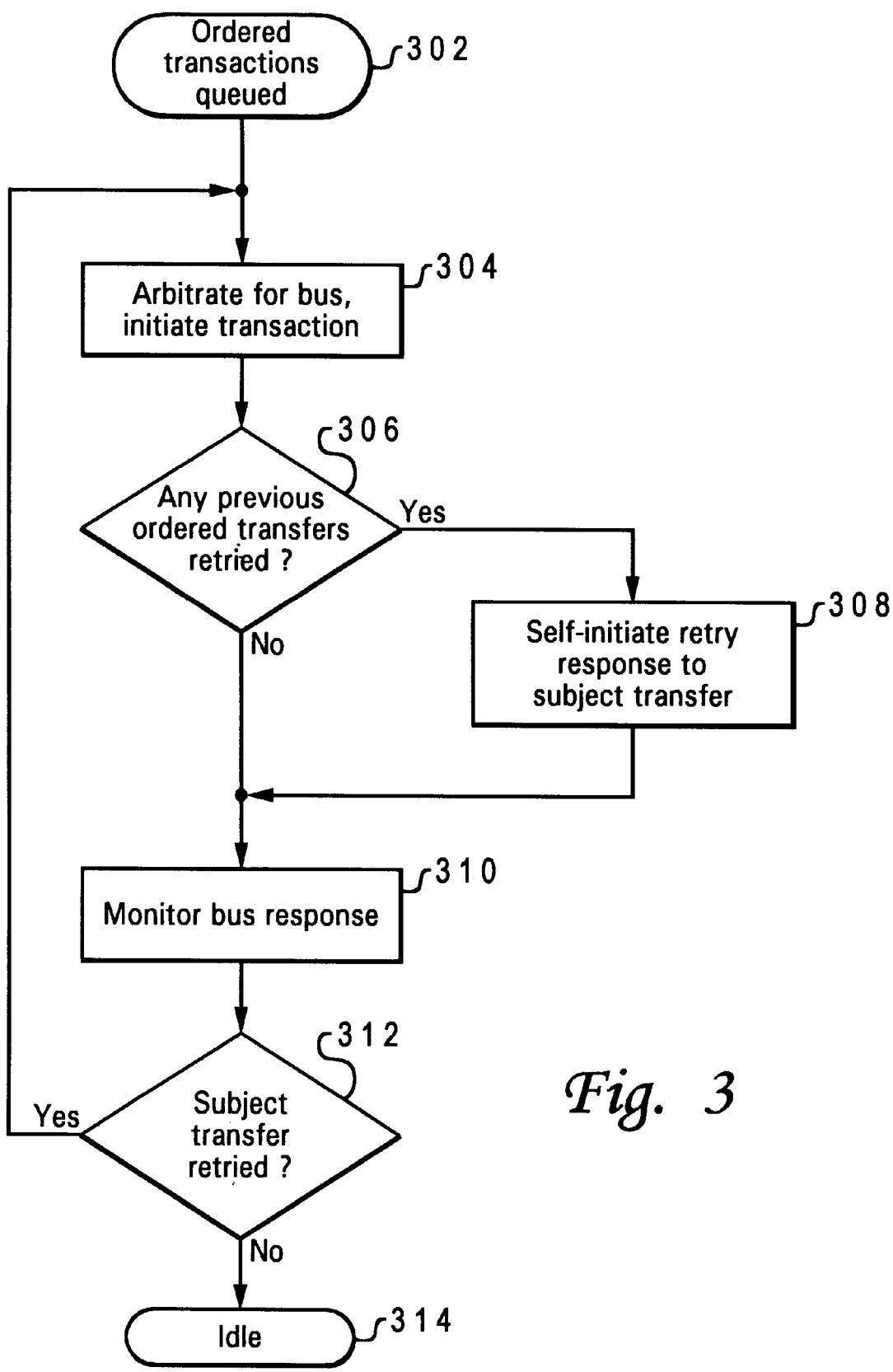
FIG. 3 depicts a high level flowchart for a process of performing ordered transactions on a pipelined bus in accordance with a preferred embodiment of the present invention.

With reference now to FIG. 3, a high level flowchart for a process of performing an ordered transaction on a pipelined bus in accordance with a preferred embodiment of the present invention is illustrated. The process depicted is for a single ordered transaction, and is therefore repeated for each transaction within an ordered series. The process begins at step 302, which depicts an ordered series of transactions being queued for transfer on a pipelined system bus, which may be in a first-in, first-out (FIFO) queue. In the exemplary embodiment, it is assumed that all previous transactions to the subject transaction have already been initiated on the bus. The process then passes to step 304, which illustrates arbitrating for the bus and, upon being granted the bus, initiating the subject transaction within the ordered series. The process next passes to step 306, which depicts a determination of whether a pending, previous transaction within the ordered series has been retried by the system. If so, the process proceeds to step 308, which depicts self-initiating a retry response to the subject transaction. Since the process depicted is being performed for all transactions within the ordered series, all pending transactions within the ordered series subsequent to a system-retried transaction will be self-retried.

Referring again to step 306, if no pending, previous transaction is retried by the system, the process proceeds instead to step 310, which illustrates monitoring the bus response to the subject transaction. The process then passes to step 312, which depicts a determination of whether the subject data transfer transaction has been retried, either by the system or by a self-initiated retry. If so, the process returns to step 304 to again arbitrate for the bus and reattempt the transaction. If not, however, the process proceeds instead to step 316, which illustrates the process becoming idle until a subsequent series of ordered transfers is queued.

Although depicted as sequential steps, some portions of the process depicted may actually occur simultaneously or in an overlapping fashion with other portions of the same process being performed for other transactions within the ordered series. For example, arbitration for the bus in order to reattempt a retried transfer may overlap with retrying a subsequent response, as depicted in FIG. 2B. Furthermore, additional steps may occur within the process, or the order of the steps shown in the example depicted may vary.

The present invention provides strict ordering of data transfer transactions without degrading system performance, independent of address-to-response latency for a particular bus protocol employed. Each transaction within an ordered series of transactions is initiated as soon as possible, taking full advantage of the pipelined nature of the bus. With the approach of the present invention, either case (whether a transaction is retried or not) is substantially faster for completing ordered transfers on the bus. Where no retry response is asserted to transactions within an ordered series, ordered and non-ordered transactions have the same latency. The invention maximizes utilization of the bus bandwidth and minimizes the impact of ordering requirements while enforcing any data transfer order requirements imposed by system operations.

While the invention has been particularly shown and described with reference to a preferred embodiment, it will be understood by those skilled in the art that various changes in form and detail may be made therein without departing from the spirit and scope of the invention.

What is claimed is:

1. A method of optimizing ordered stores on a pipelined bus, comprising:

detecting an ordered series of load or store transactions;

initiating a first load or store transaction within the ordered series on a system bus;

prior to elapse of a period for a retry response to the first load or store transaction, initiating a second, subsequent load or store transaction within the ordered series on the system bus;

monitoring the system bus for a response to the first load or store transaction; and responsive to detecting a retry response to the first load or store transaction, self-initiating a retry response to the second load or store transaction.

2. The method of claim 1, wherein the step of detecting an ordered series of load or store transactions further comprises:

queuing the ordered series of load or store transactions.

3. The method of claim 1, wherein the step of initiating a first load or store transaction within the ordered series on a system bus further comprises:

arbitrating for the system bus; and placing an address for the first load or store transaction on the system bus.

4. The method of claim 1, wherein the step of initiating a second, subsequent load or store transaction within the ordered series on the system bus further comprises:

arbitrating for the system bus; and placing an address for the second load or store transaction on the system bus.

5. The method of claim 4, wherein the step of placing an address for the second load or store transaction on the system bus further comprises:

placing the address for the second load or store transaction on the system bus two clock cycles after placing the address for the first load or store transaction on the system bus.

6. The method of claim 1, wherein the step of monitoring the system bus for a response to the first load or store transaction further comprises:

monitoring the system bus three clock cycles after placing an address for the first load or store transaction on the system bus.

7. The method of claim 1, wherein the step of self-initiating a retry response to the second load or store transaction further comprises:

detecting a system retry response to the first load or store transaction; and self-initiating a retry response on the system bus three clock cycles after placing an address for the second load or store transaction on the system bus.

8. The method of claim 1, wherein the step of self-initiating a retry response to the second load or store transaction further comprises:

detecting a self-initiated retry response to the first load or store transaction; and self-initiating a retry response on the system bus three clock cycles after placing an address for the second load or store transaction on the system bus.

9. A mechanism for optimizing ordered stores on a pipelined bus, comprising:

a queue receiving an ordered series of store transactions to be completed on a system bus;

logic for initiating a first store transaction within the ordered series on the system bus;

logic for initiating a second, subsequent store transaction within the ordered series on the system bus prior to elapse of a period for a retry response to the first store transaction;

snoop logic for monitoring the system bus for a response to the first store transaction; and response logic for self-initiating a retry response to the second store transaction responsive to detecting a retry response to the first store transaction.

10. The mechanism of claim 9, wherein the logic for initiating a first store transaction within the ordered series on a system bus further comprises:

logic for arbitrating for the system bus; and logic for placing an address for the first store transaction on the system bus.

11. The mechanism of claim 9, wherein the logic for initiating a second, subsequent store transaction within the ordered series on the system bus further comprises:

logic for arbitrating for the system bus; and logic for placing an address for the second store transaction on the system bus.

12. The mechanism of claim 11, wherein the logic for placing an address for the second store transaction on the system bus further comprises:

logic for placing the address for the second store transaction on the system bus two clock cycles after placing the address for the first store transaction on the system bus.

13. The mechanism of claim 9, wherein the logic for monitoring the system bus for a response to the first store transaction further comprises:

logic for monitoring the system bus three clock cycles after placing an address for the first store transaction on the system bus.

14. The mechanism of claim 9, wherein the logic for self-initiating a retry response to the second store transaction further comprises:

logic for detecting a system retry response to the first store transaction; and logic for self-initiating a retry response on the system bus three clock cycles after placing an address for the second store transaction on the system bus.

15. The mechanism of claim 9, wherein the logic for self-initiating a retry response to the second store transaction further comprises:

logic for detecting a self-initiated retry response to the first store transaction; and logic for self-initiating a retry response on the system bus three clock cycles after placing an address for the second store transaction on the system bus.

16. A method of optimizing ordered transactions on a pipelined bus via self-initiated retry, comprising:

initiating each load or store transaction in an ordered series on a system bus prior to elapse of a period for all responses to preceding, pending load or store transactions in the ordered series which were previously initiated on the system bus;

monitoring a response to each load or store transaction within the ordered series pending on the system bus; and responsive to detecting a system retry response to a pending load or store transaction within the ordered series:

self-initiating a retry response to each pending load or store transaction subsequent to the system retried transaction within the ordered series; and reattempting the system retried load or store transaction and each subsequent load or store transaction within the ordered series.

17. The method of claim 16, wherein the step of initiating each load or store transaction in an ordered series on a system bus prior to elapse of a period for all responses to preceding pending load or store transactions in the ordered series previously initiated on the system bus further comprises:

initiating a load or store transaction in the ordered series on the system bus every other clock cycle.

18. The method of claim 16, wherein the step of monitoring a response to each load or store transaction within the ordered series pending on the system bus further comprises:

monitoring the response on the system bus three clock cycles after placing an address for a corresponding load or store transaction within the ordered series on the system bus.

19. The method of claim 16, further comprising:

detecting a system retry response to a pending load or store transaction within the ordered series on the system bus three clock cycles after placing an address for a corresponding load or store transaction within the ordered series on the system bus.

20. The method of claim 16, further comprising:

automatically requiring the system retried load or store transaction and each subsequent load or store transaction within the ordered series.

\* \* \* \* \*

UNITED STATES PATENT AND TRADEMARK OFFICE
CERTIFICATE OF CORRECTION

PATENT NO. : 6,269,360 B1  Page 1 of 1
DATED : July 31, 2001
INVENTOR(S) : Petersen et al.

It is certified that error appears in the above-identified patent and that said Letters Patent is hereby corrected as shown below:

<u>Title page,</u>
Item [73], please add the Assignee -- Motorola, Inc., Schaumburg, IL 60196 --

Signed and Sealed this

Tenth Day of September, 2002

*Attest:*

*Attesting Officer*

JAMES E. ROGAN
*Director of the United States Patent and Trademark Office*